(12) United States Patent
Laxenaire et al.

(10) Patent No.: US 7,170,206 B2
(45) Date of Patent: Jan. 30, 2007

(54) METHOD FOR THE PRODUCTION OF A ROTOR FOR AN ELECTRIC TURNING MACHINE

(75) Inventors: Arnaud Laxenaire, Le Touquet (FR); Guillaume Tromeur, Paris (FR)

(73) Assignee: Valeo Equipements Electriques Moteur, Creteil (FR)

( * ) Notice: Subject to any disclaimer, the term of this patent is extended or adjusted under 35 U.S.C. 154(b) by 389 days.

(21) Appl. No.: 10/333,681

(22) PCT Filed: May 29, 2002

(86) PCT No.: PCT/FR02/01803

§ 371 (c)(1),
(2), (4) Date: Aug. 15, 2003

(87) PCT Pub. No.: WO02/097953

PCT Pub. Date: Dec. 5, 2002

(65) Prior Publication Data

US 2004/0056559 A1    Mar. 25, 2004

(30) Foreign Application Priority Data

May 31, 2001 (FR) .................................. 01 07178

(51) Int. Cl.
*H02K 1/04* (2006.01)
(52) U.S. Cl. ........................... 310/43; 310/64; 310/263
(58) Field of Classification Search ................ 310/263, 310/179, 180, 52, 64, 43
See application file for complete search history.

(56) References Cited

U.S. PATENT DOCUMENTS

| | | | |
|---|---|---|---|
| 1,751,971 A | | 3/1930 | Barnum |
| 3,305,740 A | * | 2/1967 | Shano .......................... 310/42 |
| 4,943,747 A | * | 7/1990 | Lee ............................ 310/67 R |
| 5,091,028 A | * | 2/1992 | Yamazaki et al. ........... 156/172 |
| 5,539,265 A | * | 7/1996 | Harris et al. ................. 310/263 |
| 5,714,822 A | * | 2/1998 | Kawano et al. ............. 310/179 |

FOREIGN PATENT DOCUMENTS

| | | |
|---|---|---|
| DE | 38 42 563 | 6/1990 |
| EP | 1 079 504 A2 | 2/2001 |
| FR | 2 809 546 | 11/2001 |
| JP | A 55-92552 | 7/1980 |

* cited by examiner

*Primary Examiner*—Darren Schuberg
*Assistant Examiner*—Nguyen Hanh
(74) *Attorney, Agent, or Firm*—Berenato, White & Stavish (57) ABSTRACT

The invention proposes a method of making a rotor (12) for a rotary electrical machine, the rotor including a core (14) on which there is formed at least one electrical winding (16) comprising at least one electrically conductive element (18) which is coated with an outer bonding layer (32), of the type in which the winding step is followed by a step of change of state which causes softening of the bonding material to take place and which then causes it to solidify once more, characterized in that the winding of the conductive element (18) is carried out on the convex outer cylindrical wall (40) of a tubular element (42) of the core, and in that, after the said step of change of state, the tubular element (42) is assembled on a core body (44) in such a way as to minimize the temperature gradient in the winding (16) during the step of change of state.

10 Claims, 4 Drawing Sheets

METHOD FOR THE PRODUCTION OF A ROTOR FOR AN ELECTRIC TURNING MACHINE

FIELD OF THE INVENTION

This invention proposes a method of making a rotor for a rotary electrical machine.

STATE OF THE ART

As is known, rotary electrical machines comprise a rotor and a stator, on each of which an electrical winding can be made.

The rotary electrical machine may be an alternator which converts rotary movement of the rotor into electric current, as described for example in the document W001/93406.

An electrical machine may also be a motor which converts an electric current passing through a winding of the rotor into rotary movement of the rotor. The machine may be reversible, so that it will convert mechanical energy into electrical energy and vice versa, as described for example in the document W001/69762.

The alternator in this case, therefore, enables the engine of the motor vehicle to start.

Each electrical winding consists of a coil of at least one electrically conductive element which is clad with a layer of electrically insulating material. In transverse cross section, a winding therefore comprises a horizontal and vertical juxtaposition of portions of the electrically conductive element which are joined together by a varnish.

The winding of the rotor of a rotary electrical machine is generally formed in a coil body of electrically insulating plastics material, which consists of an annular element having a U-shaped axial half cross section.

The winding body guides the electrically conductive element while it is being wound. However, it often happens that the transverse wings of the winding body move slightly apart from each other, thereby giving rise to poor winding. The electrically conductive element may become caught up in the raised transverse wing portions of petals. Also, during transport prior to impregnation of varnish, partial radial sinking of some portions of the electrically conductive winding element may occur, which moves the flanks of the winding body apart and causes it to widen. Thus, when the winding so made comes to be interposed between the two pole wheels, the winding is compacted, and this introduces the risk of damage to the electrically conductive layer, in particular that on the axial end portions of the conductor, thereby creating contacts between them which will give rise to a loss of resistance. In addition, the radial winding may prevent the contact between the hub on which the winding and the two pole wheels are mounted, which sets up a parasitic air gap of the core with respect to the pole wheels, and in consequence a loss of power and performance of the rotary electrical machine.

Varnish is subsequently deposited on the winding and is then set, so fixing the faults in the winding.

Setting of the varnish may be obtained by heating the winding in an autoclave. This step is consequently very long.

In addition, the winding body, which is generally of plastics material, constitutes a thermal screen between the winding, the core, and the pole wheels, which is detrimental to transfer and dissipation of the heat produced by the passage of current in the electrically conductive element during operation of the rotary electrical machine, and it reduces the performance of the rotary electrical machine.

With a view to limiting these problems, and in accordance with French patent application No. 00/06853 of May 29, 2000, published under the No. FR-A-2 809 546, another solution consists in using an electrically conductive element which is clad with at least one layer of electrically insulating material, and which is coated with a bonding layer which comprises a bonding material that enables adjacent portions of the coated electrically conductive element to be bonded together.

The bonding material may also join the winding and hub together.

It is thus possible to omit the winding body, so as to improve transfer and dissipation of the heat produced in the winding when the rotor is operating.

For this purpose, during the winding step, the clad and coated electrically conductive element may be guided transversely by two transverse plates which determine the width of the winding. The two transverse plates enable the clad and coated electrically conductive element to be held in place.

Subsequently, the method of making such a winding comprises a step of change of state of the bonding material, which consists in causing it to be softened or to melt so that it at least partly fills the interstices that exist between the adjacent portions of the conductive element, and which causes it to solidify once again and to join together the adjacent portions of the conductive element.

The step of change of state may then comprise a step of heating the bonding material. The latter can be carried out in an autoclave. However, it is of advantage to cause the bonding material to be softened or melted by heating the conductive element by Joule effect. To this end it is necessary to cause a current having a sufficiently high intensity to flow in the conductive element, so as to heat it.

However, the core of the rotor which consists of a solid member, which is preferably of magnetic steel and which tends to absorb the heat produced by Joule effect in the winding.

The transfer and dispersion of heat from the winding to the core of the rotor causes a temperature gradient to exist in the winding.

In this connection, part of the heat produced by the inner turns of the winding, that is to say those which are situated in contact with or close to the core, is absorbed by the core, which limits the increase in their temperatures.

As a result of this, at the end of the heating step, the temperature reached by the bonding material that coats the inner turns of the conductive element is lower than that reached by the bonding material on the other turns. The difference between these two temperatures can be as much as several tens of degrees Celsius.

Given that the temperature of the conductive element must remain lower than a maximum temperature so as not to damage the layer of electrically insulating material, the temperature reached by the bonding material with which the inner turns of the conductive element are coated is generally lower than the softening or melting temperature of the bonding material.

In consequence, the bonding material is unable to join together the adjacent portions of the inner turns of the conductive element.

This is prejudicial to performance of the rotary electrical machine.

For example, during operation of the rotary electrical machine, the lower turns of the winding may vibrate, which causes noise.

Loosening of the winding with respect to the core can also cause noise.

The vibrations of the internal turns with respect to each other gives rise to wear of the insulating material layer, which increases the danger of short circuits.

In addition, such a method does not enable half-core pole wheels to be used, that is to say pole wheels which are made in one piece with one part of the core. In this connection, the claws extend axially above the half cores of the pole wheels and, in consequence, prevent the winding of the conductive element on the core.

OBJECT OF THE INVENTION

With a view to overcoming these drawbacks, the invention proposes a method of making a rotor for a rotary electrical machine, the rotor including a core on which there is formed at least one electrical winding comprising at least one electrically conductive element which is wound in such a way as to form the winding and which is clad with at least one layer of an electrically insulating material and coated with an outer bonding layer which comprises a bonding material that enables adjacent portions of the coated conductive element to be joined together, of the type in which the winding step is followed by a step of change of state, in particular by Joule effect heating of a conductive element which causes softening or melting of the bonding material so that it at least partially fills the interstices that exist between the adjacent portions of the wound conductive element, and which then causes it to solidify once more so as to bond together the adjacent portions of the clad conductive element. The method of manufacture is characterised in that the winding of the conductive element is carried out on the convex outer cylindrical wall of a tubular element of the core, and in that, after the said step of change of state, the tubular element is assembled on a core body in such a way as to minimise the temperature gradient in the winding during the step of change of state.

The invention enables half-core pole wheels to be used. These pole wheels are robust, so that it is possible to interpose magnets between the claws of the pole wheels in the manner described for example in the document FR-A-2 793 085.

It is thus possible to increase the power of the rotary electrical machine due to the presence of the permanent magnets.

It will also be noted that better heat dissipation is obtained between the electrically conductive winding and the pole wheels of the rotor.

In addition, the tubular element of the core takes part in the obtaining of good magnetic flux when the electrical winding is activated so as to obtain north and south poles in the region of the claws.

The tubular element enables the thickness of the half cores of the pole wheels to be reduced, albeit within the limits defined by good resistance to centrifugal force in the pole wheels.

The pole wheels can more easily be made by forging, so that they are more homogeneous.

Good resistance of the tubular element of the core to non-cyclical effects set up by the heat engine of the vehicle is obtained.

Thanks to the invention, the external diameter of the pole wheels can be increased, because they are more robust due to the presence of the half cores, so that the power of the machine can be increased and magnetic noise reduced.

In addition, there are low temperature gradients between the tubular element of the core and the winding, because the tubular element has a lower thickness than a conventional core.

According to further features of the invention:

the tubular element is shrunk on to the core body;

the tubular element is adhesively bonded on the core body;

the core comprises an external tubular element, on the convex outer cylindrical wall of which the winding is formed.

the inner cylindrical wall of the tubular element includes at least one element formed as a hollow or a projecting element, which co-operates with a complementary projecting or hollow element of the core body, whereby to prevent rotation of the tubular element with respect to the core body;

the tubular element consists of a metallic leaf rolled into a tube and welded;

the core body is formed in two substantially cylindrical parts which extend axially towards each other, each from a transverse face of one pole wheel of the rotor;

the tubular element is of steel;

the tubular element is of aluminium;

at least one face of the tubular element is anodised;

an electrically insulating element is interposed axially between the windings and the convex outer cylindrical wall of the tubular element of the core, and holds the winding and tubular element mechanically together;

the bonding material in the external bonding layer is a polymer of the thermosetting type;

the bonding material in the external bonding layer is a polymer of the thermoplastic type.

BRIEF DESCRIPTION OF THE DRAWINGS

Further features and advantages of the invention will appear on a reading of the following detailed description, for an understanding of which, reference will be made to the attached drawings, in which.

DESCRIPTION OF PREFERRED EMBODIMENTS OF THE INVENTION

Figure 1:
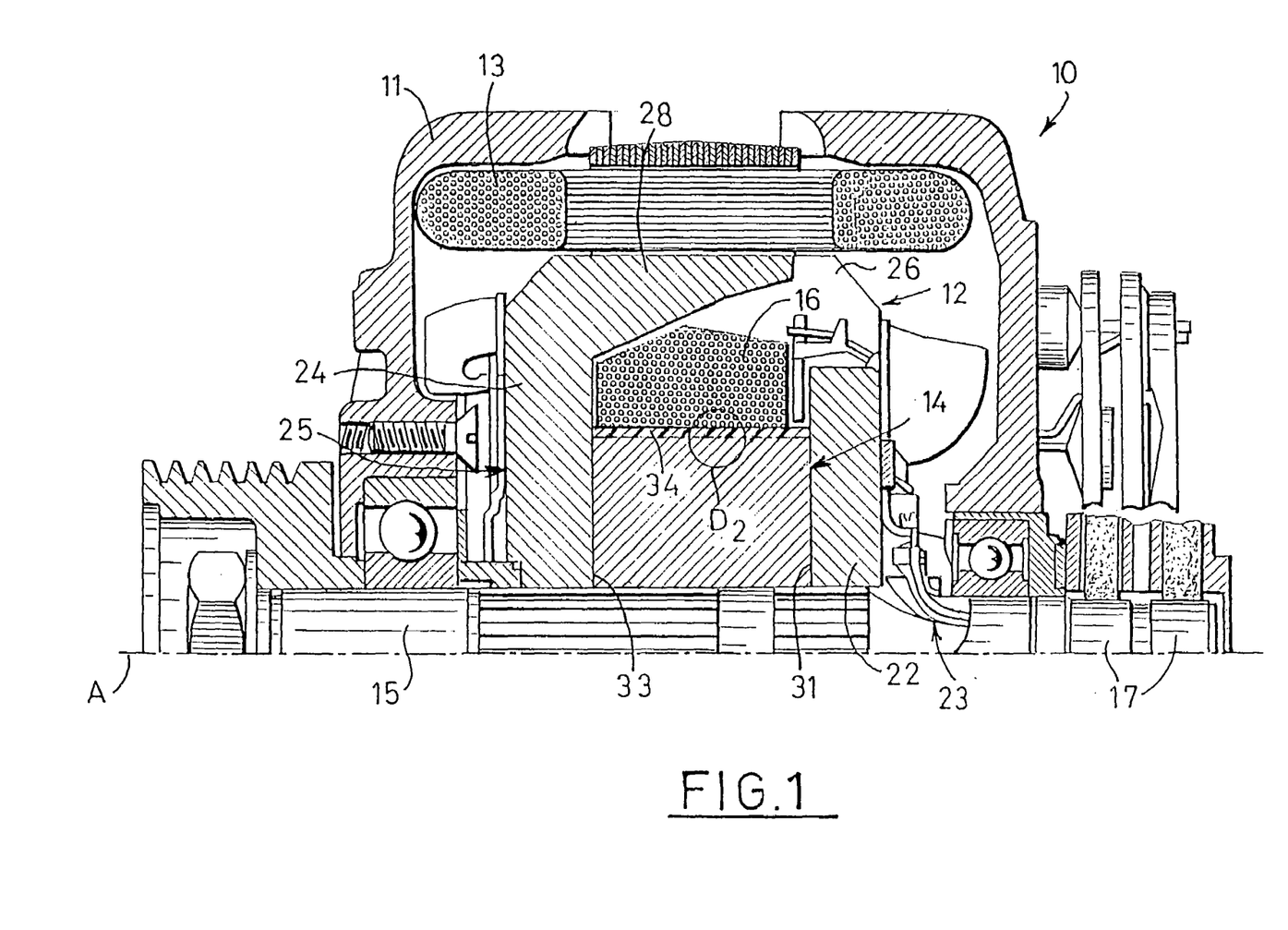
FIG. 1 shows diagrammatically, in partial cross section, a rotary electrical machine having a rotor winding which is formed with a wire which is clad with a layer of insulating material and coated with a bonding material.

FIG. 1 shows diagrammatically an alternator 10 which consists mainly of a two-part casing 11 which carries within it two main components, these being a rotor 12 and a stator 13.

The stator 13 surrounds the rotor 12 which is fixed to an output shaft 15 having an axis of rotation A, on the rear end of which are fixed two slip rings 17.

The rotor 12 consists mainly of a core 14 on which an electrical winding 16 is formed.

The electrical winding 16 is made for example by winding turns of an electrically conductive element such as copper wire, which is clad with at least one layer of electrically insulating material.

The rotor 12 in this example is a rotor of the claw type which consists of the cylindrical electrical winding 16, which is mounted between two plates 22 and 24, each of which includes respective claws 26 and 28 which extend generally towards the other plate 24 and 22. The claws 26 and 28 are offset circumferentially from each other in such a way that one claw 26 of the plate 22 is interposed between two adjacent claws 28 of the plate 24, and vice versa. For more details, reference should be made to the document EP-B-0 515 259 or the document WO01/93406, which also shows the rotor of a rotary electrical machine and more particularly an alternator.

The plates 22, 24 and their claws 26, 28 respectively are referred to here as pole wheels 23 and 25.

Figure 2:
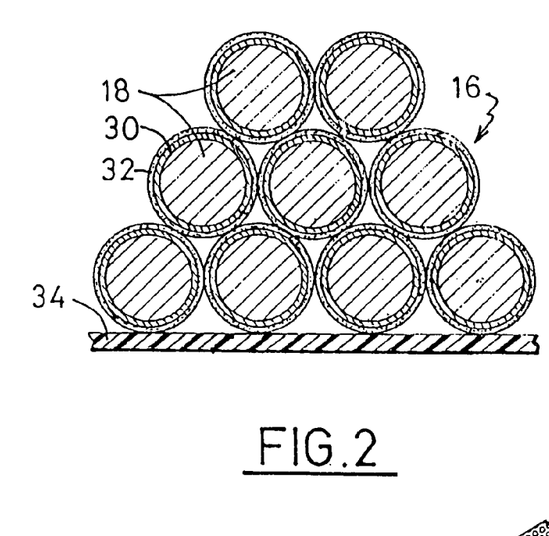
FIG. 2 shows on a large scale the detail D2 from FIG. 1, prior to the step of changing the state of the bonding material.

FIG. 2 shows on a large scale, in transverse cross section, part of the winding of the conductive element 18 clad with a layer 30 of electrically insulating material.

The clad conductive element 18 is also coated with a bonding layer 32 of a bonding material with which adjacent portions of the conductive element 18 are joined together.

In the known way and in accordance with FIG. 2, an electrically insulating leaf 34 is interposed between the electrical winding 16 and the core 14. It enables the risks of any short circuits occurring between the winding 16 and core 14 to be reduced or eliminated.

The material of the electrically insulating leaf 34 can also be a thermal conductor. During operation of the rotary electrical machine, this is favourable to the evacuation of heat to the core 14, this heat being produced by the flow of electrical current in the conductive element 18.

The insulating leaf 34 may also extend over the transverse walls of the winding 16, so as to eliminate the risks of any short circuits occurring between the winding 16 and the pole wheels, not shown, of the rotary electrical machine.

The insulating leaf 34 may include an electrically insulating structural element such as paper or insulating tissue, at least one of the faces of which is at least partially coated with a bonding material.

The bonding material of the insulating leaf is preferably chemically compatible with the bonding material in the layer 32.

During manufacture of the rotor 12, the adjacent portions of the conductive element 18 are preferably joined together in a step of changing the state of the material in the bonding layer 32.

The step of changing state causes the bonding material to become softened or melted so that it will at least partially fill the interstices that exist between the adjacent portions of the conductive element 18, and then causes it to become solidified again so as to join together the adjacent portions of the conductive element 18.

The step of changing state corresponds to a modification of the structure of the bonding material, that is to say a relative movement of some of its constituent atoms with respect to the others.

The step of changing the state of the material comprises a step of heating the bonding layer to a hardening temperature which is greater than or equal to the melting point of the bonding material, so as to cause it to melt or soften in order that it runs or flows whereby to fill, preferably substantially entirely, the interstices that exist between the adjacent portions of the conductive element 18.

The heating step is followed by a cooling stage, in the course of which the bonding material hardens or solidifies once again.

The hardening temperature or setting temperature of the bonding material is the temperature from which the structure of the material is modified whereby the material bonds together the elements with which it is in at least partial contact.

The bonding material is preferably a polymer.

Thus, where the polymer is of the thermosetting type, in the remainder of this description and in the claims, the hardening temperature will be referred to as its reticulation temperature.

Similarly, where the material is of the thermoplastic type, then in the remainder of this description and in the claims the hardening temperature will be called its melting temperature.

Where the bonding material is a polymer, the heating step causes it to be polymerised, while the cooling step solidifies it so as to ensure that the adjacent portions of the clad conductive element 18 are rigidly bonded together.

Where the insulating leaf 34 is coated with a bonding material such as a polymer, the step of heating to a temperature greater than or equal to the hardening temperature of the bonding material, and the cooling step, cause it to be joined to the core 14 of the rotor 12 and enable its connection with the adjacent portions of the clad conductive element 18 to be reinforced.

The heating step consists in heating the clad and coated electrically conductive element 18 by Joule effect, in such a way as to bring the temperature of the bonding material to a temperature greater than or equal to its hardening temperature.

However, the insulating leaf 34 enables heat produced by Joule effect to be transferred from the winding to the core 14. This heat transfer causes a temperature gradient to be set up within the winding 16. The inner turns of the winding 16 which lie close to the core 14 are at a temperature lower than the temperature of the other turns of the winding 16.

Given that a substantial quantity of heat is transferred from the inner turns to the core 14, the temperature of these turns does not increase enough to enable the bonding material to polymerise, so that adjacent portions of the inner turns of the conductive element 18 are prevented from being bonded together.

For example, where the temperature of the outer turns is of the order of 240° C., that is to say greater than the hardening temperature which is of the order of 200° C., the temperature of the inner turns is of the order of 130° C., the temperature of the core 14 having increased by a few tens of degrees.

The temperature, of the order of 130° C., in the inner turns does not allow the bonding material to change its state.

Figure 3:
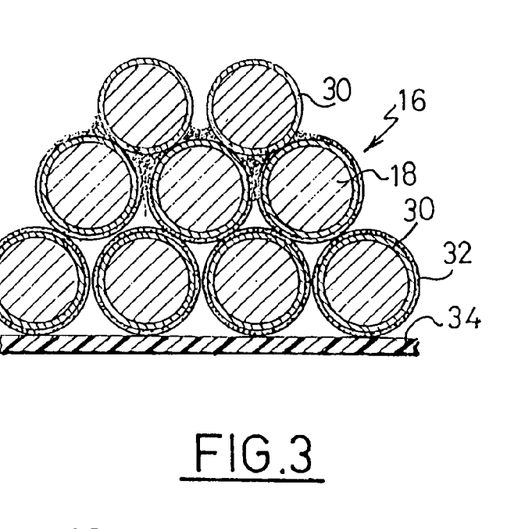
FIG. 3 is a view similar to that shown in FIG. 2, after the step of changing the state of the bonding material in accordance with the state of the art.

FIG. 3 shows partially an internal zone of the winding 16 in the rotor 14, in which the bonding layer 32 of the inner turns has not changed state, whereas the layer bonding the turns which lie towards the outside has polymerised so as to join them together.

In addition, as was described above, such a method of making the rotor 12 does not permit the use of pole wheels of the half-core type to be used. This reduces the output of the rotary electrical machine.

Equally, where the rotor 12 includes two pole wheels 23 and 25 and a core 14 which are separate from each other, there exist two contact faces 31, 33 which lie on either side of the transverse faces of the core 14, thereby creating two parasitic air gaps which are detrimental to the output of the rotary electrical machine.

Moreover, in operation, the forces produced by rotation of the rotor 12 have a tendency to cause the pole wheels 23 and 25, and more particularly their claws 26 and 28, to move axially apart. In order to limit this effect, it is necessary to stiffen the pole wheels 23, 25.

The stiffening effect may be obtained by increasing the dimensions of the pole wheels 23 and 25, which increases the weight of the rotor 12 and reduces the performance of the rotary electrical machine.

Stiffening may also be achieved with the use of pole wheels of the half-core type, which is difficult to envisage with the method of manufacture used. In this connection, the claws of half-core pole wheels are detrimental to the process of winding the conductive element 18 on the core 14.

Figure 4:
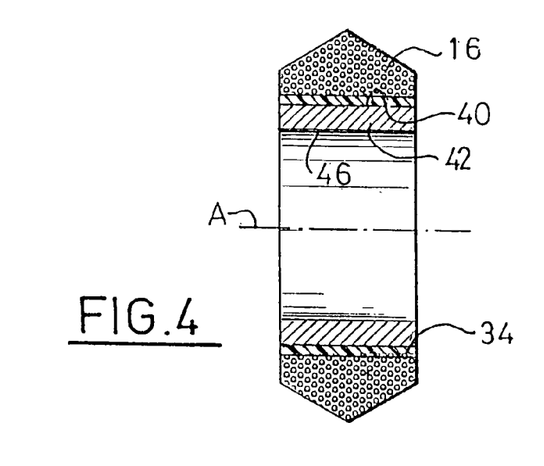
FIG. 4 is a view in partial axial cross section of the winding made in accordance with the invention.

In order to overcome these disadvantages, the invention proposes that the winding of the conductive element 18 is carried out on the convex outer cylindrical wall 40 of a tubular element 42, in accordance with FIG. 4.

In a first embodiment, the core 14 then consists of the tubular element 42, which is in the form of a tube the wall thickness of which is low as compared with its diameter, together with a core body 44 having an outer diameter substantially equal to the inner diameter of the tubular element 42.

The tubular element 42 may consist of a portion of a tubular member, and it may also consist of a metallic leaf which is rolled into a tube and welded.

The tubular element 42 may be made of steel. It may also comprise aluminium and one of its faces may be anodised.

After the step of changing state, the tubular element 42 is assembled on the core body 44.

Thus the tubular element 42 is not assembled on the core body 44 during the step of changing state. In consequence, the low thickness of the wall reduces its mass and the thermal absorption capacity of the core 14. This reduces the transfer and dispersion of heat and minimises the temperature gradient within the winding 16 during the step of changing state of the bonding material.

The method of the invention thus enables the development of the winding temperature to be controlled in such a way as to optimise the bond between adjacent portions of the conductive element 18.

Assembly of the tubular element 42 and body 44 of the core 14 may be obtained by adhesive bonding. The adhesive is then deposited on a cylindrical wall 46, 48 of the tubular element 42 and/or of the body 44. Adhesion may be carried out either hot or cold.

The tubular element 42 and core body 44 may be assembled together by a shrinking-on process. In that case, the diameter of the inner cylindrical wall 46 of the tubular element 42 is smaller than the diameter of the outer cylindrical wall 48 of the body 44. To carry out the assembly operation, the temperature of the tubular element 42 and/or body 44 is modified so as to give rise to a dimensional variation.

For example, the tubular element 42 is heated to a so-called shrinking-on temperature in order to cause it to dilate in such a way that its inner diameter is greater than the outer diameter of the body 44, so as to enable them to be fitted axially one within the other. Cooling of the tubular element 42 causes a return to the initial dimensions to take place in such a way that it is assembled together with the body 44 with a radial gripping force.

The shrinking-on temperature must be greater than the maximum working temperature, so as to reduce the chance of the rotor coming apart when the rotary electrical machine is in operation.

In order to prevent rotation of the tubular element 42 with respect to the core body 44 in accordance with FIGS. 5 to 8, the inner cylindrical wall 46 of the tubular element 42 includes at least one recessed or projecting element 50 that co-operates with a complementary projecting or recessed element 52 of the core body 44.

Figure 5:
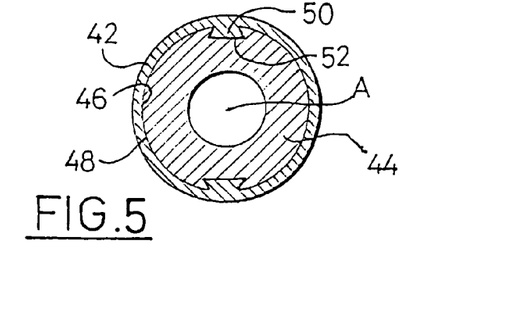
FIGS. 5 to 8 are views in transverse cross section of the winding made in accordance with various versions of a first embodiment of the invention.

FIG. 5 shows a projecting element 50 of the inner cylindrical wall 46 of the tubular element 42 which is in cooperation with a complementary hollow element 52 of the core body 44. In this example the elements 50 and 52 are of the dovetail type.

Figures 6, 7, 10:
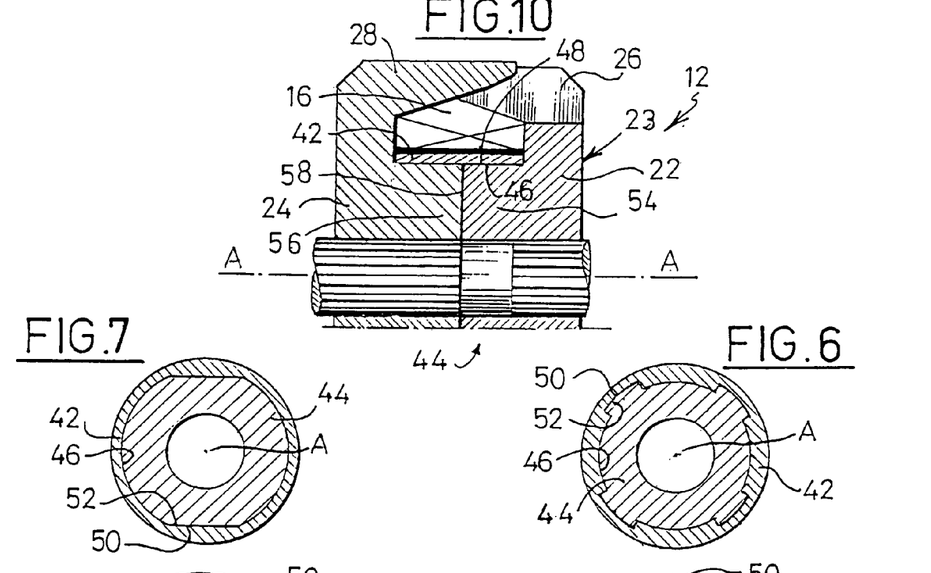
FIG. 10 is a view in partial axial cross section of the rotor in which the winding is made according to the second embodiment of the invention.

FIG. 6 shows a version which is the opposite of that shown in the foregoing Figure, that is to say the element 50 is recessed in the cylindrical inner wall 46 of the tubular element 42, and is in cooperation with a complementary projecting element 52 of the core body 44.

Figure 8:
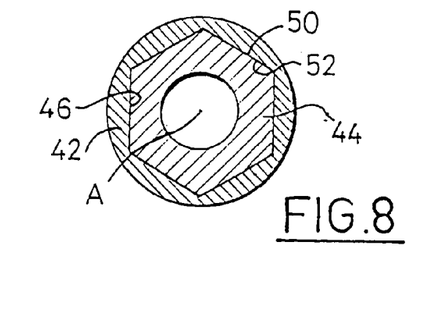

In accordance with FIGS. 7 and 8, the elements 50 and 52 of the internal wall 46 of the tubular element 42 and core body 44 respectively consist of flats which are in mutual cooperation so as to prevent rotation of the tubular element 42 with respect to the core body 44.

When the tubular body 42 is assembled to the body 44, the solid core 14 assists absorption of the heat produced by the winding 16 in operation of the rotary electrical machine, which optimises its output.

Figure 9:
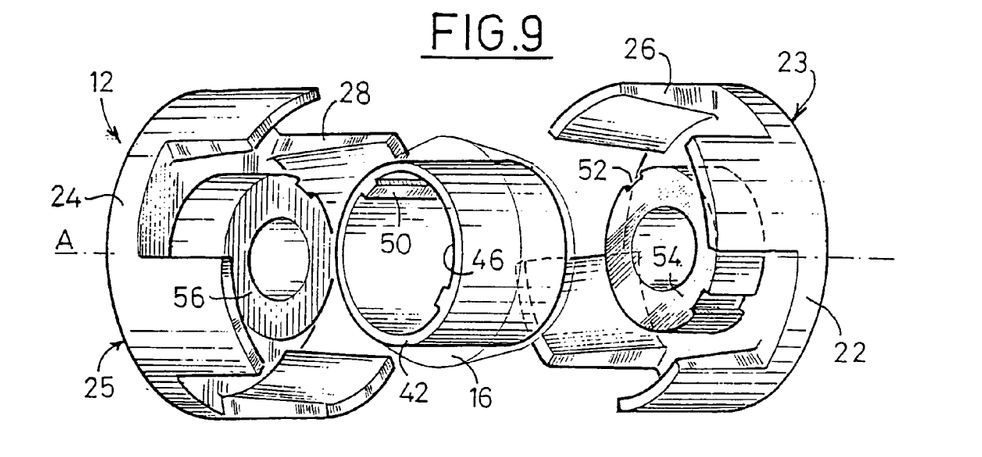
FIG. 9 is an exploded perspective view of a rotor made in accordance with a second embodiment of the invention.

In a second embodiment shown in FIGS. 9 and 10, the core body 44 consists of two substantially cylindrical parts 54, 56 which extend axially towards each other, each from a transverse face of one pole wheel 23, 25 of the rotor 12. The pole wheels 23, 25 are accordingly referred to as half-core pole wheels.

Assembly of the tubular element 42 together with the two parts 54 and 56 of the core body 44 is carried out after the step of changing state in a similar way to the first embodiment.

Such a method enables the pole wheels 23 and 24 to be stiffened, in particular in the axial direction, and increases its resistance to outside influences such as high speed, and internal influences such as vibrational stresses due to accelerations and decelerations.

It is thus possible to increase the speed of rotation of the rotor 12 without causing the claws 26 and 28 of the pole wheels 23 and 25 to move axially apart.

For the same reasons, for a constant speed of rotation it is possible to increase the diameter of the rotor 12 as compared with a rotor made in the state of the art, and this increases the performance of the rotary electrical machine.

In addition, the half-core pole wheels 23, 25 enable parasitic air gaps to be reduced. In this connection, there is only one contact face 58 instead of two, thereby only creating one air gap, as is shown in FIG. 7. In particular, this causes the magnetic noise to be reduced and increases the performance of the rotary electrical machine.

It is also possible to make use of interpolar magnets which improve the performance of the rotary electrical machine.

The foregoing description is not limiting. In this connection the tubular element 42 may have a similar form without departing from the field of protection of the invention.

Figure 11:
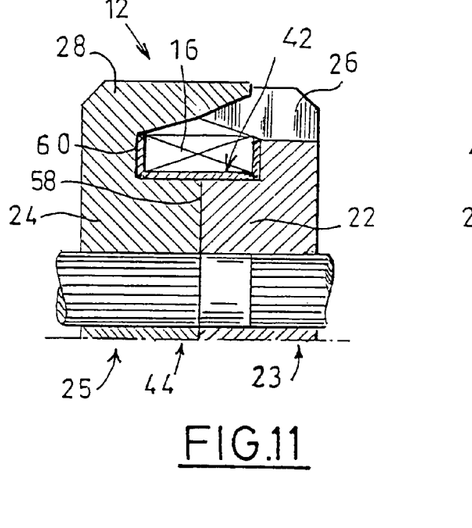
FIGS. 11 to 14 are views in partial axial cross section of the rotor in which the winding is made in accordance with various different embodiments of the invention.

The tubular element 42 may have two annular flanks 60 which extend radially towards the outside of the rotor 12 in accordance with FIG. 11. Thus, the winding 16 is retained axially by the flanks 60, which in particular enables handling of the winding 16 to be facilitated. Moreover, the flanks 60 may have, on their outer peripheral edge, slots which are provided for the purpose of receiving the projecting elements of the pole wheels 23, 25, in facing relationship with each other so as to prevent any possible rotation of the winding and the tubular element 42 with respect to the core body 44.

The structures may of course be reversed. The notches are then formed in the pole wheels 23, 25 and the projecting elements are formed in the flanks 60.

The projecting elements or slots in the pole wheels 23, 25 may be formed in the plate 22, 24 or in the claws 26 and 28.

By way of variation, one of the flanks 60, namely the one closer to the slip rings, is extended at its outer periphery by two axial lugs, each of which penetrates into a recess delimited by two consecutive claws 26 or 28. Guides are moulded in situ on these lugs.

The guides serve for fastening the endmost wires of the winding 16, each of which is connected to one of the slip rings.

One of these guides can be seen in FIG. 1.

In all cases, means for preventing rotation are arranged between at least one of the flanks 60 and the pole wheel 23, 25 adjacent to that flank 60.

Figure 12:
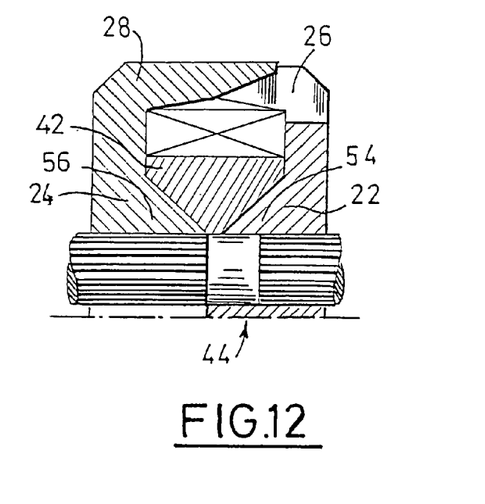

In another version shown in FIG. 12, the tubular element 42 can have a triangular axial cross section which is complementary to the two parts 54 and 56 of the body 44, which are accordingly frustoconical. The inclination of the interfaces between the tubular element 42 and the two parts 54 and 56 is able to reduce losses due to parasitic air gaps.

Figure 13:
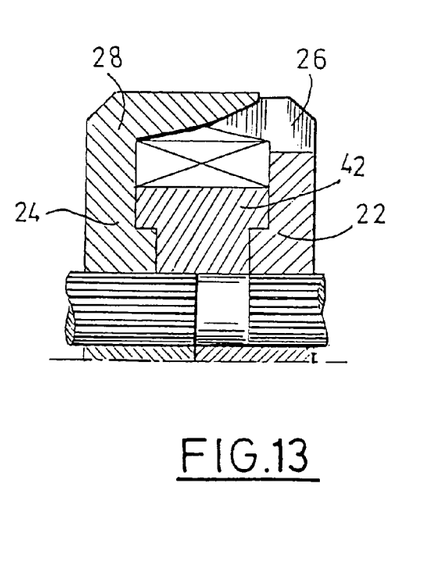
Figure 14:
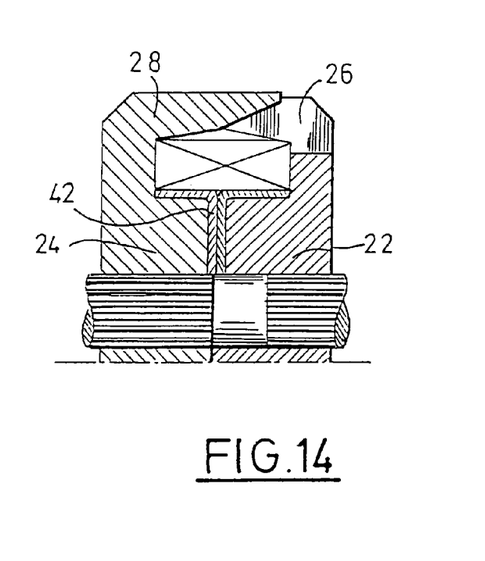

In further versions, the tubular element 42 can have a T-shaped axial cross section. The tubular element 42 is then for example formed in the solid by forging or machining, or by forming from a tube, in accordance with FIGS. 13 and 14 respectively.

The rotary electrical machine may of course be reversible and may work in an alternator mode and in a starter mode, as described in the document WO01/69762.

It is possible in that case, because of the presence of the half-core pole wheels, to provide permanent magnets between the claws so as to increase the power of the machine.

In all cases, the claws are less sensitive to centrifugal force, and move apart less under the action of the latter due to the presence of the half cores.

The invention claimed is:

1. A rotor for a rotary electrical machine, comprising a core (14) on which there is formed at least one electrical winding (16), at least one electrically conductive element (18) which is wound in such a way as to form the winding (16) and which is clad with at least one layer (30) of an electrically insulating material and coated with an outer bonding layer (32) which comprises a bonding material that enables adjacent portions of the coated conductive element (18) to be joined together, in which the winding step is followed by a step of change of state, by Joule-effect heating of a conductive element (18), which causes melting of the bonding material so that the bonding material at least partially fills the interstices that exist between the adjacent portions of the wound conductive element (18), and which then causes the bonding material to solidify once more so as to bond together the adjacent portions of the wound conductive element (18), wherein the winding of the conductive element (18) is disposed on the convex outer cylindrical wall (40) of a tubular element (42) of the core, and wherein, after the said step of change of state, the tubular element (42) is assembled on a core body (44) in such a way as to minimize the temperature gradient in the winding (16) during the step of change of state, and wherein the core (14) comprises an external tubular element (42), on the convex outer cylindrical wall (40) of which the winding (16) is formed, and wherein an electrically insulating element is interposed axially between the windings (16) and the convex outer cylindrical wall (40) of the tubular element (42) of the core, and holds the winding (16) and tubular element (42) mechanically together.

2. A rotor for a rotary electrical machine according to claim 1, wherein the concave inner cylindrical wall (46) of the tubular element (42) includes at least one element (50) formed as a hollow or a projecting element, which co-operates with a complementary projecting or hollow element (52) of the core body (44), whereby to prevent rotation of the tubular element (42) with respect to the core body (44).

3. A rotary electrical machine rotor according to claim 1, wherein the tubular element (42) consists of a metallic leaf rolled into a tube and welded.

4. A rotary electrical machine rotor according to claim 1, wherein the core body (44) is formed in two substantially cylindrical parts (54, 56) which extend axially towards each other, each from a transverse face of one pole wheel (23, 25) of the rotor (12).

5. A rotary electrical machine rotor according to claim 1, wherein the tubular element (42) is of steel.

6. A rotary electrical machine rotor according to claim 1, wherein the tubular element (42) is of aluminium.

7. A rotary electrical machine rotor according to claim 1, wherein at least one face of the tubular element (42) is anodised.

8. A rotary electrical machine rotor according to claim 1, wherein the bonding material in the external bonding layer (32) is a polymer of the thermosetting type.

9. A rotary electrical machine rotor according to claim 1, wherein the bonding material in the external bonding layer (32) is a polymer of the thermoplastic type.

10. A rotor for a rotary electrical machine, comprising a core (14) on which there is formed at least one electrical winding (16), and at least one electrically conductive element (18) which is wound in such a way as to form the winding (16) and which is clad with at least one layer (30) of an electrically insulating material and coated with an outer bonding layer (32) which comprises a bonding material that enables adjacent portions of the coated conductive element (18) to be joined together, wherein the bonding material at least partially fills the interstices that exist between the adjacent portions of the wound conductive element (18), the bonding material bonding together the adjacent portions of the wound conductive element (18), and wherein the winding of the conductive element (18) is disposed on the convex outer cylindrical wall (40) of a tubular element (42) of the core, the tubular element (42) being assembled on a core body (44) in such a way as to minimize the temperature gradient in the winding (16) during the step of change of state, and wherein the core (14) comprises an external tubular element (42), on the convex outer cylindrical wall (40) of which the winding (16) is formed, and wherein an electrically insulating element is interposed axially between the windings (16) and the convex outer cylindrical wall (40) of the tubular element (42) of the core, and mechanically holds the winding (16) and tubular element (42) together.

* * * * *